Figure 4:
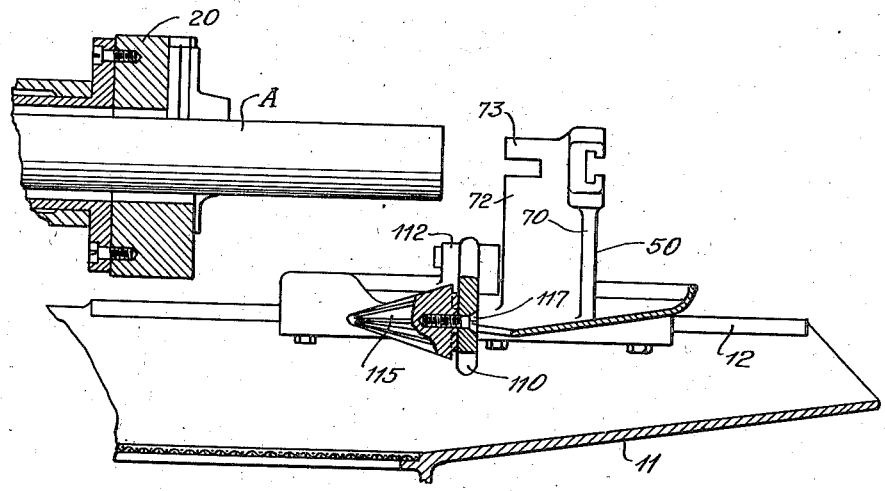

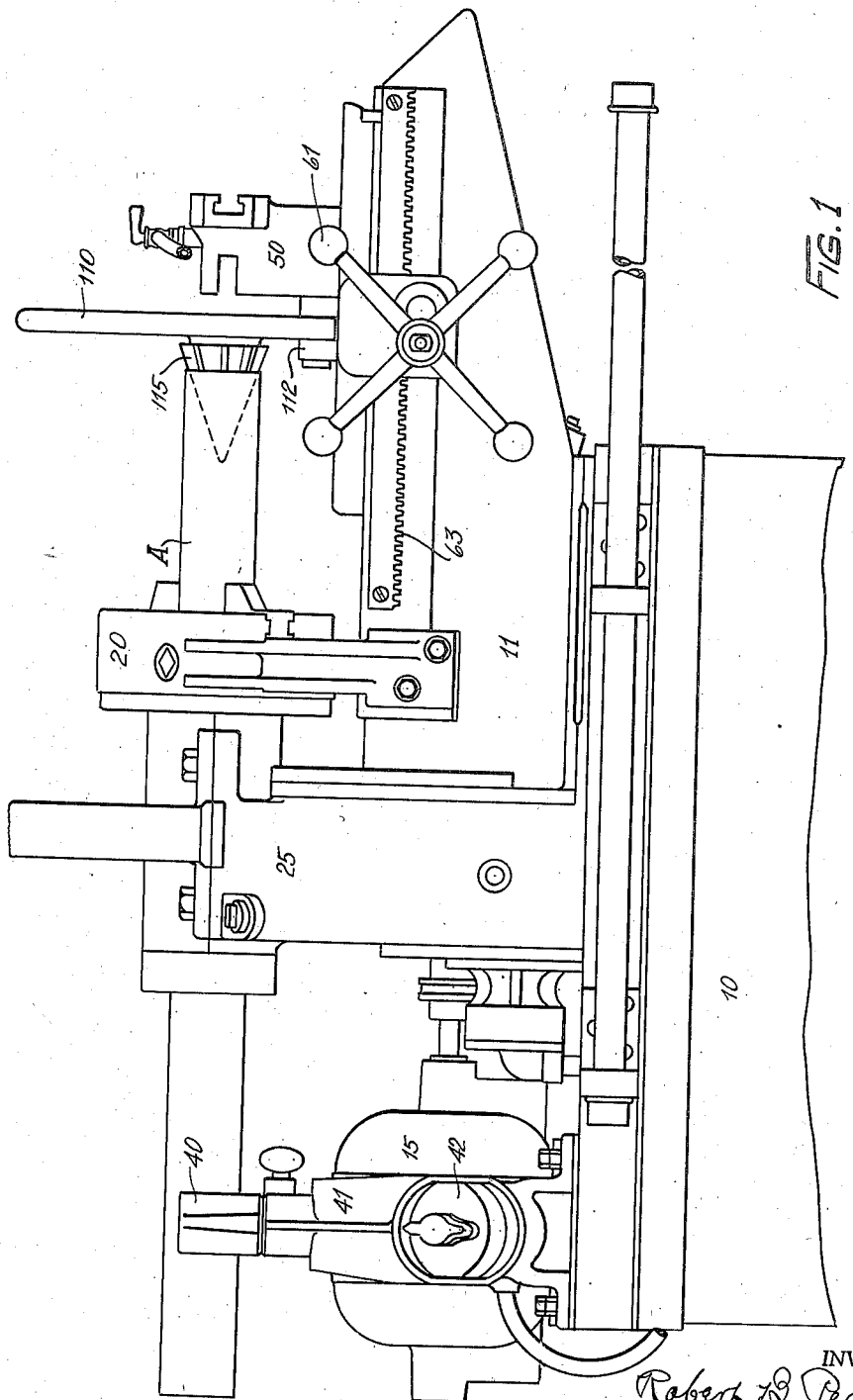

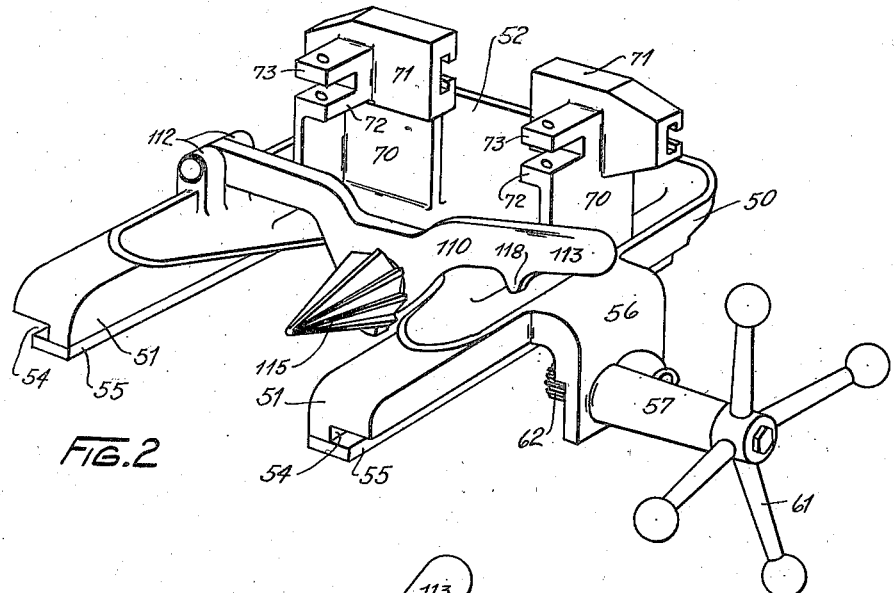
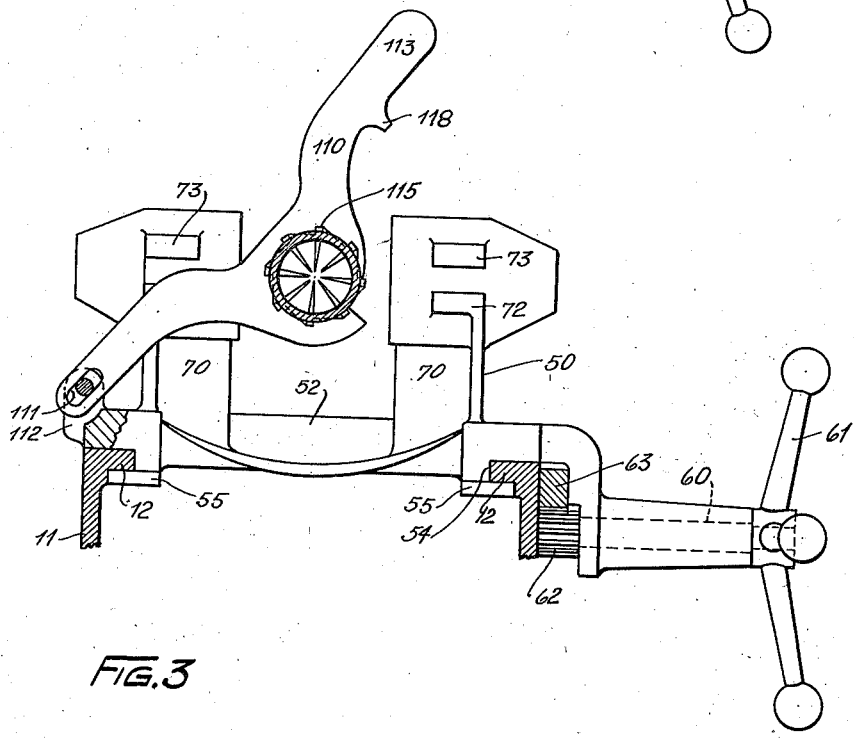

May 4, 1937.  R. B. PEALER  2,079,181
MACHINE FOR REAMING AND BEVELING PIPE
Filed April 29, 1936  3 Sheets-Sheet 3

INVENTOR.
Robert B. Pealer
BY
Bates, Golrick & Teare
ATTORNEYS.

Patented May 4, 1937

2,079,181

UNITED STATES PATENT OFFICE 2,079,181

MACHINE FOR REAMING AND BEVELING PIPE

Robert B. Pealer, Warren, Ohio, assignor to Beaver Pipe Tools, Inc., Warren, Ohio, a corporation of Ohio Application April 29, 1936, Serial No. 77,011

9 Claims. (Cl. 82—2)

This application is a continuation in part of my copending application, Serial No. 56,145, filed December 26th, 1935, for a Pipe working machine, and assigned to my assignee, Beaver Pipe Tools, Inc.

This invention of this application is concerned with mechanism carried by a pipe-working machine adapted to trim the remaining end of the pipe after a portion has been removed.

A more specific object of the invention has been to provide a reaming tool permanently carried by the carriage and adapted to be manually brought into engagement with the pipe whenever desired to remove the internal fin which may be formed by the pipe cutter.

Still another object has been to arrange the reamer so that it may be utilized to form a bevel on the exterior of the pipe when this is desirable. For effecting this, I provide a conical reaming tool with a plurality of cutting ribs carried on the cone and means to mount the tool on the support so that it can be variably positioned to compensate for wear on any one rib.

My invention, comprising the means by which I obtain the above objects, or any of them, will be more apparent from the following detailed description of a preferred embodiment of the invention shown in the drawings.

Figures 5, 6:
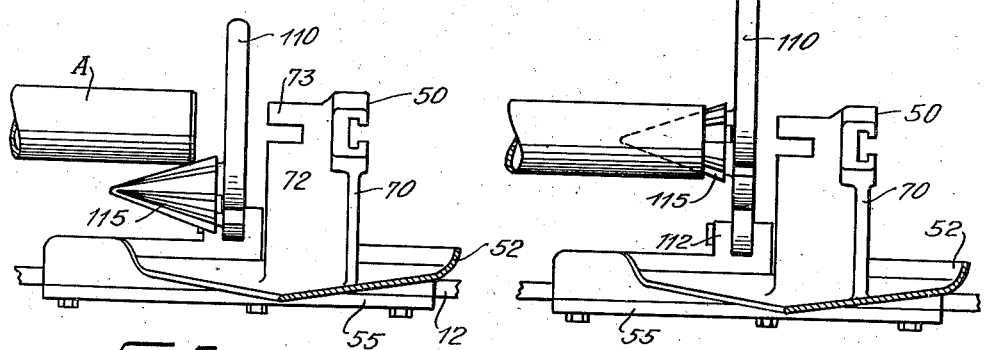
Figures 7, 8:
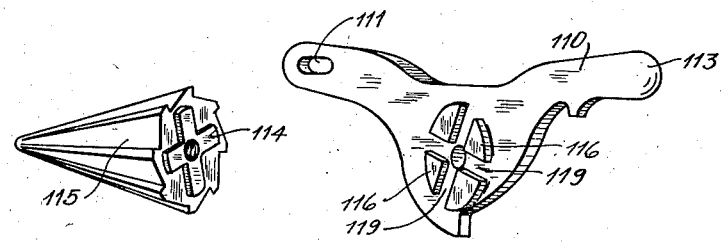

In the drawings, Fig. 1 is a side elevation of my complete pipe working tool; Fig. 2 is a perspective of the slidable carriage, adapted to support the reamer; Fig. 3 is an end view of the reamer in place on the machine bed, showing the same in position for reaming the pipe; Fig. 4 is a longitudinal section along the chuck axis, showing the reaming tool in an inactive position; Figs. 5 and 6 are fragmentary views, similar to Fig. 4, the first showing the reamer in position to bevel the pipe and the latter showing the tool in position to ream out a pipe; Figs. 7 and 8 are details showing the reamer and its mount and the manner in which the same are fastened together.

Briefly, the entire machine shown in Fig. 1 may comprise a frame 10 carrying an overhanging bed 11; a driving motor 15 supported on the bed 10; a rotating chuck 20 mounted in a hollow standard 25 which houses reduction gearing connecting the motor to the chuck, and a carriage 50 slidably mounted on the extension bed 11 and carrying the pipe-working tools.

The chuck 20 is of any suitable form adapted to clamp a pipe, illustrated at A in Fig. 1. The pipe is shown also as resting behind the chuck on a pipe rest 40 mounted on a standard 41 of inverted U-shape, which is secured to the bed and extends over the motor and carries the motor-controlling switch 42.

The extension frame 11 is an open trough-like member having a pair of inwardly projecting ledges 12 at the top of its side walls shown in Figs. 3 and 4. The carriage, shown in perspective in Fig. 2, is a casting approximately in the form of a horizontal U, thus providing two straight base portions 51 connected by a yoke portion 52. The base portions rest on the top of the extension frame 11 and are longitudinally rabbeted so that they extend down and along the inner faces of the ledges 12, as shown at 54. To the bottom of the portions 54 I bolt longitudinal strips 55, which underhang the ledges 12, thus slidably attaching the carriage to the extension bed, while enabling its removal if desired.

Extending forwardly and downwardly from the carriage frame is a bracket 56, which may be an integral part of the casting and which carries a forwardly extending tubular boss 57. Mounted in this boss is a shaft 60 to the outer end of which is secured a suitable hand-wheel 61; on the inner end of the shaft is a spur pinion 62 meshing with a downwardly facing stationary rack 63 formed on the front wall of the extension bed 11. This construction enables the carriage to be moved toward and from the chuck, as desired.

The carriage 50 includes two upstanding posts 70 having horizontally extending heads 71. These heads have on their inner faces toward the chuck suitable means for carrying the threading unit. As shown, this comprises horizontal web-like portions 72 and horizontal ears 73 above such web-like portions. The threading unit is more fully described in my copending application above referred to.

The two post heads 71, on the opposite side from the chaser carrying ways, have horizontal ways in which the cutter frame is mounted, as more fully described in my copending application Serial No. 56,145.

The reaming mechanism comprises a lever 110 (Figs. 2 and 3) pivoted at the lengthwise extending slot 111 to ears 112 rising from the carriage, the lever extending across the carriage and terminating in a handle portion 113 in a convenient location back of the hand wheel 61. Bolted to the face of the lever, on the side toward the chuck, is a reaming cone 115 which has ratchet-like cutting ribs usual with pipe reamers. This cone is shown in Fig. 7 as having a parallel-sided cross-shaped boss 114 on its head occupying correspondingly shaped recesses 119 in the lever 110 formed by bosses 116 and is held in place by a screw bolt 117 passing through the lever into the cone. The lever normally rests in the position shown in Fig. 2, with the intermediate portion of the lever and the cone well below the region of the largest pipe, but with the handle 112 held sufficiently above the carriage frame by a lug 118 on the lever so that the handle may be readily grasped.

When it is desired to ream a pipe, as, for instance, to remove the interior fin formed by the cutting wheel, the carriage is moved by its hand wheel 61 until the reamer is beyond the end of the pipe, then the reamer lever is lifted into the position shown in full lines in Figs. 3 and 6, that is, in axial alignment with the pipe; then the carriage is returned to bring the reaming cone into the pipe, which, being rotated by the chuck, is effectively reamed.

In my machine the same reaming tool may be used to bevel the exterior of the pipe; that is to say, when the lever is in its normal position of rest as shown in Fig. 5, the carriage may be positioned so that an intermediate portion of the length of the reamer cone lies directly beneath the end of the pipe, and then the lever may be raised into such position as indicated in Fig. 5, where the non-rotating cone engages the exterior of the rotating pipe and is thus effective to bevel the end thereof.

The boss 114 on the reamer cone has been described as parallel sided, and as occupying a similar recess in the lever, preventing the cone rotating. This construction, however, enables the cone to have two different positions interchangeably so that fresh ribs of the reamer may be brought into the region which is active for bevelling the pipe, if, after long use, such bevelling operates to dull the reaming tool. By making two slots in the lever at right angles to each other, or by making the boss square, the bevelling tool could take any of four active positions, if desired.

From the foregoing description it will be apparent that I have provided very simple pipe reaming mechanism which is mounted in a normally unused location on the carriage and without requiring any enlargement of the carriage, this mechanism, however, being available whenever desired to ream the pipe. In such reaming operation the reamer proper is self-centering to compensate for any orbital movement the pipe may have. The same reamer is so mounted that it may act as a bevelling tool for the exterior of the pipe. To increase its efficiency in this latter operation, the reaming element is mounted in its support in such manner that it may be set in different positions to make different reaming ribs active for the bevelling operation, thus increasing the life of the tool. The entire reaming device is simple and inexpensive.

I claim:

1. The combination of a frame, a rotary chuck carried thereby, a carriage slidably carried by the frame, a hand lever on the carriage, a reaming tool carried by the hand lever, said hand lever being freely pivoted so that it will normally drop by gravity into a position out of the range of and below a pipe in the chuck but adapted to be brought into such range by movement of the hand lever.

2. The combination of a frame, a rotary chuck carried thereby, a carriage slidably carried by the frame, a hand lever mounted on the carriage, a tool carried by the hand lever, said tool being shiftable by movement of the hand lever to ream the interior of the pipe or bevel the exterior thereof, as desired, the pivot axis of the lever being spaced from the chuck axis a sufficient distance so that the cutting angle of the tool is substantially unchanged in reaming and beveling.

3. The combination of a frame, a rotary chuck carried thereby, a sliding carriage on the frame, a lever movable in a vertical plane and pivotally mounted on the carriage at the rear of the pipe and extending forwardly beneath the pipe, a reaming tool on the side face of the lever, the relative position of the tool and the pivot being such that the reaming tool may be caused to be axially aligned with the chuck to ream the interior of the pipe and be caused to engage the exterior of the pipe to bevel it at the end, without material change in the cutting angle of the tool.

4. In a pipe working machine, the combination of a frame, a rotary chuck carried thereby, a sliding carriage on the frame, a lever on the carriage below the pipe axis freely pivoted to the carriage behind said axis so that it will normally drop by gravity out of the path of the pipe, said lever being formed with a hand grip in front of the axis, a conical pipe reamer carried by the lever extending in a direction toward the chuck, the position of the reamer being so related to the pivot of the lever that the elevation of the handle portion of the lever may bring the reamer into axial alignment with the chuck.

5. In a pipe working machine, the combination of a frame, a chuck rotatably carried thereby, a carriage slidably mounted on the frame, a lever pivotally mounted on the carriage extending crosswise of the pipe axis and beneath it, a reaming tool mounted on the lever and adapted to be positioned in axial alignment with the pipe by the manual raising of the lever, there being a loose connection in the pivot of the lever whereby the reaming tool adapts itself to the pipe notwithstanding an orbital movement of the pipe.

6. In a pipe working machine, the combination of a frame, a chuck rotatably carried thereby, a carriage slidably carried by the frame having a pair of parallel arms, a lever pivotally carried by one of said arms and adapted to normally rest on the other, a slot in said lever at the pivot point, a conical reaming tool carried by the lever having a plurality of cutting edges carried on its conical portions and pointing in the general direction toward the chuck, the reaming tool and the lever having inter-engaging shoulders enabling the tool to be variably positioned on the lever.

7. In a pipe working machine, the combination of a frame, a chuck carried thereby, a carriage slidably mounted on the frame and having an upstanding portion adapted to carry a tool for working the pipe, the carriage in the region between the upstanding portion and chuck being intermediately open, a lever pivoted to the rear portion of the carriage and extending across the open space thereof and intermediately widened to depend into such open space when the lever is in its position of rest, and a conical reaming tool secured to the lever and projecting from the widened region thereof in a direction parallel with the pipe axis, whereby the manual raising of the lever may bring the reaming tool into registration with a pipe in the chuck.

8. In a machine of the character described, the combination of a rotary chuck, a pivotally mounted lever, a conical fluted tool rigidly carried by the lever and pointing in a general direction toward the chuck, the tool and lever having inter-engaging shoulders provided by a parallel sided boss on one of such members and a parallel sided recess on the other, whereby the relative position of the tool and the lever may be changed and the tool thereafter rigidly held on the lever, the lever being swingable to bring a cutting edge of the tool into contact with the exterior end surface of the pipe.

9. In a pipe working machine, the combination of a frame, a rotary chuck carried by said frame, a hand lever carried by the frame, a conical tool having a plurality of radially disposed cutters disposed over the conical surface, a cross-shaped recess and a cross-shaped boss, one carried by said lever and the other carried by the tool, and means to secure said tool to said lever by retaining said boss in said recess to adjustably position the cutting edges of the tool, as desired, the lever being swingable to cause the cutters to engage selectively the interior or exterior edge surface of the pipe.

ROBERT B. PEALER.